United States Patent [19]

Applegate et al.

[11] Patent Number: 5,461,388

[45] Date of Patent: Oct. 24, 1995

[54] DUAL GPS TIMER APPARATUS AND METHOD

[75] Inventors: John D. Applegate, Andover; Alan R. Helfinstine, Brooklyn Center; Daniel L. Wieberdink, Andover, all of Minn.

[73] Assignee: Honeywell Inc., Minneapolis, Minn.

[21] Appl. No.: 261,563

[22] Filed: Jun. 17, 1994

[51] Int. Cl.⁶ ................................................. H04B 7/185
[52] U.S. Cl. ........................ 342/357; 455/8; 364/424.06; 364/449
[58] Field of Search ................... 342/357; 455/8; 371/8.1, 4

[56] References Cited

U.S. PATENT DOCUMENTS 3,451,042  6/1969  Jensen et al. ............................ 371/8.1
4,700,348  10/1987  Ise et al. ................................... 371/8.1
5,101,356  3/1992  Timothy et al. ........................... 364/449

Primary Examiner—Thomas H. Tarcza
Assistant Examiner—Dao L. Phan
Attorney, Agent, or Firm—Charles J. Ungemach

[57] ABSTRACT

A GPS utilizing redundant GPS receivers having position and time mark outputs connected directly to a processing block so that the time marks from both GPS receivers are received by the processing block and, in the event a first of the GPS receivers output becomes unusable and the system uses a second of the redundant GPS receivers while periodically checking the first for reusability, no time will be lost in the validation of the new channel.

9 Claims, 2 Drawing Sheets

DUAL GPS TIMER APPARATUS AND METHOD

BACKGROUND OF INVENTION

1. Field of the Invention

The present invention relates to Global Positioning Systems (GPS) and, more particularly, to those utilizing dual Global Positioning receivers.

2. Description of the Prior Art

GPS is well known in the prior art. The systems utilize a plurality of satellites which broadcast, among other data, their exact location along with Universal Time Coordinated (UTC) to indicate when the broadcast position was valid. A GPS receiver located on an aircraft, for example, receives the broadcast from several satellites and determines aircraft body rates, accelerations, pseudo range as well as aircraft position to a high degree of accuracy and transmits this data, along with a time indication for showing when the data was valid, to, for example, the Flight Management System (FMS) aboard the aircraft. Many aircraft also utilize information from independent sources (e.g. gyroscopes and accelerometers) to provide position, velocity and attitude information to the FMS. While the attitude information from gyroscopes and accelerometers is quite accurate, position and velocity information may grow somewhat less accurate over time because of drift. The GPS solution error, however, is more constant regardless of flight time. More sophisticated systems, may utilize both GPS rate information and an independent source of rate information (such as gyroscopes and accelerometers) to produce a "Hybrid" signal. For example, the Honeywell HG2001AC01, comprise an Inertial Reference Unit (IRU) which includes inertial reference hardware such as gyroscopes and accelerometers that provide position, attitude and rate information (including a cyclical interrupt to which all internal processes are synchronized and from which an indication as to when the information is valid can be derived) and an IRU processing block which may be an 80960 processor, with attendant memory, timing hardware and operational flight software. The processing block, receives the information from the gyroscopes and accelerometers, including the cyclical interrupts, and also receives the GPS information, including time marks, from the GPS receivers, and operates to produce the "Hybrid" signal which is utilized by the FMS. The time mark signal produced by the GPS receiver in conjunction with the UTC (exact time) of the time mark which is broadcast to the IRS by the receiver over a communication bus (such as the ARINC 429) is used to synchronize the incoming GPS data with the internal IRS data including the cyclical interrupt. The hybrid signal is thus generated using time correlated IRS and GPS data.

Because the GPS information can become invalid or unusable (as indicated, for example, by the absence of a time mark signal), it may be desirable to use redundant GPS receivers. While three or more GPS receivers could be used, the HG2001AC01 is set up to utilize two GPS receivers so that if one of them becomes invalid or unusable, the other one may be utilized. This redundant GPS receiver system requires that when the primary GPS receiver becomes unusable and the secondary GPS receiver is being employed, the condition of the primary GPS receiver be rechecked periodically to determine if it can later be used again. Accordingly, the HG2001AC01 uses a switching scheme in the form of a multiplexor to receive the information and the time mark from both GPS receivers (one at a time) and to pass the signals from the selected GPS receiver on to the system processor where the GPS information is combined with the IRS information to produce the hybrid information for the FMS. Upon the incapacitance of the primary GPS receiver, the multiplexor switches the secondary GPS receiver to the system processor for use during the time that the primary GPS receiver is not being used. During this time, a periodic reversionary check of the primary GPS receiver is performed to see if it is again usable and if so it switches the primary GPS receiver back to being the source of information for producing the Hybrid signals.

Unfortunately, every time that a channel switch is made, a validation procedure must be run before the data can be assimilated for use in the hybrid solution and up to ten seconds of secondary channel data can thus be lost.

BRIEF DESCRIPTION OF THE PRESENT INVENTION

The present invention overcomes the problem above by connecting the outputs of both GPS receivers to the processing block directly and never switching from one to the other. This eliminates the multiplexor and allows the processing block to continuously monitor and validate both GPS receiver outputs simultaneously and utilizing the information from the primary one as long as it is valid and from the secondary when the primary becomes invalid and then monitoring the primary for possible reinstatement as the information source without risking the loss of data.

DETAILED DESCRIPTION OF THE PREFERRED EMBODIMENT

Figure 1:
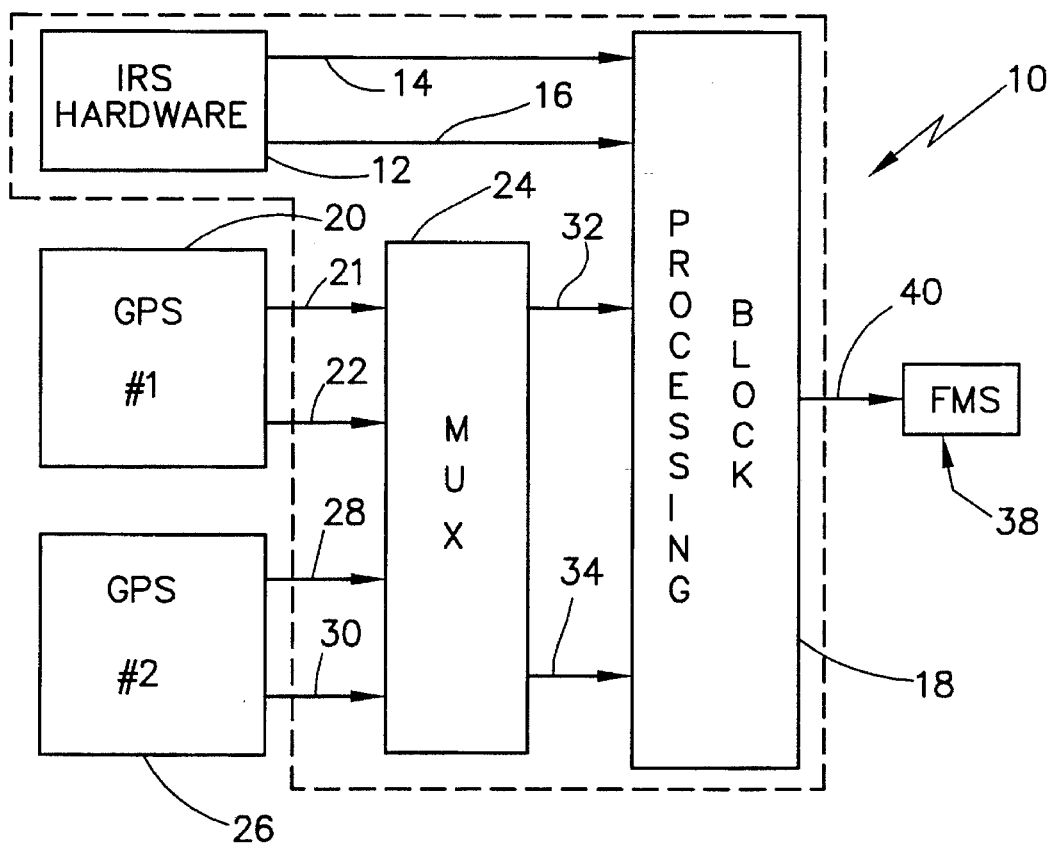
FIG. 1 shows a block diagram of the HG2001AC01 system.

FIG. 1 shows an Inertial Reference System 10 in dashed lines. The IRS 10 includes an IRS hardware box 14, which incorporates gyroscopes and accelerometers, to provide outputs indicative of position, rate and attitude on a connection 14 and a cyclical interrupt that synchronizes all of the internal operations on a connection 16 to a processing block 18. A first GPS receiver 20 is shown producing an output containing GPS data, including position and rate information, on a connection 21 (over a data bus such as the ARINC 429) and a time mark, utilized to synchronize the GPS data with the inertial reference data, on a connection 22 to a multiplexing switch (MUX) 24. A second GPS receiver 26 is shown producing an output containing GPS data, including position and rate information, on a connection 28 and a time mark on a connection 30 to the MUX 24. MUX 24 normally passes the position information from GPS 20 via connection 32 and the time mark via connection 34 on to the processing block 18. Processing block 18 receives the GPS information on connections 32 and 34 and the IRS information on connections 14 and 16 and creates the hybrid solution utilizing both input sources. The resulting hybrid signal is presented to the flight management system 138 by way of a connection 40.

If GPS 20 were to become invalid or unusable, the MUX 32 would switch the GPS 26 so that it became the primary source of GPS information to the processing block 18. The MUX 24 also periodically switches the GPS 20 back into connection with the processing block 18 so that a determination can be made that GPS 20 is no longer invalid and can be switched back to being the primary source of GPS information to the processing block 18. Every time that a channel switch is performed, a validation procedure must be run before the data can be assimilated for use in the hybrid solution and, as explained above, up to ten seconds of information can be lost.

Figure 2:
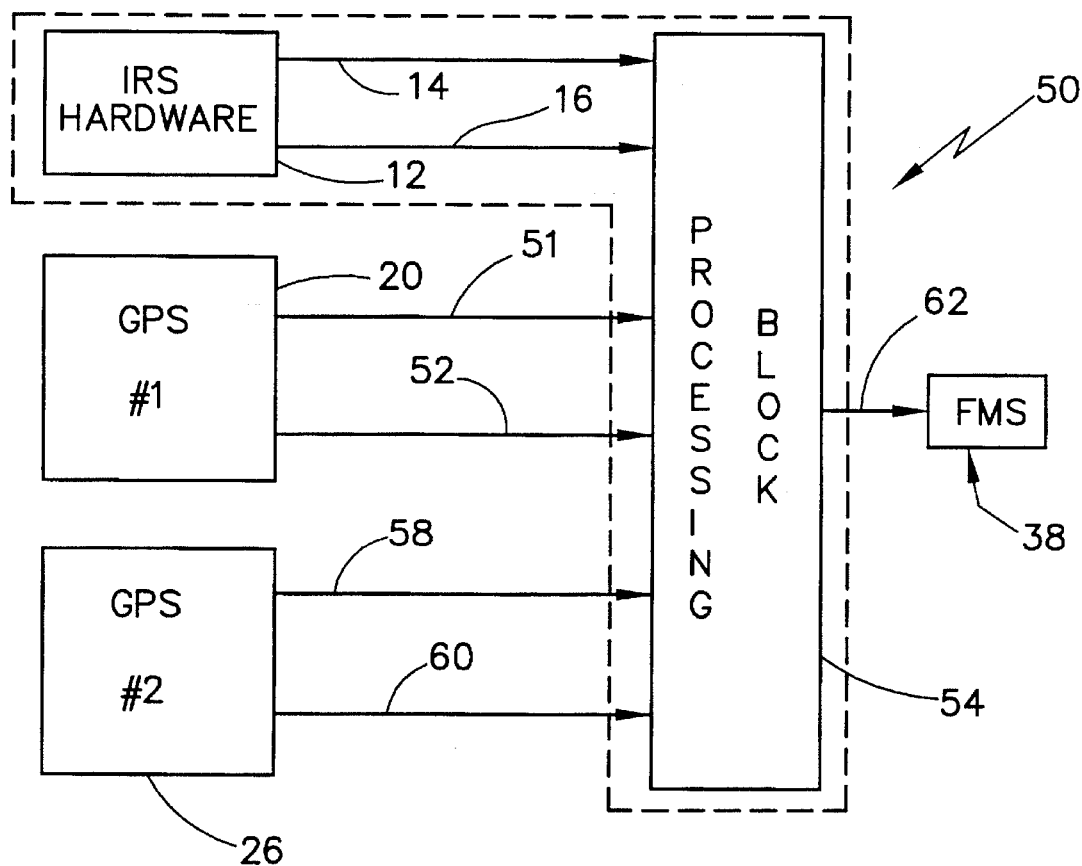
FIG. 2 shows a block diagram of the preferred embodiment of the present invention.

This problem is overcome in the present invention as seen in FIG. 2 wherein the MUX 24 in the IRS system 10 of FIG. 1 has been removed to provide a new IRS system 50 of FIG. 2. In FIG. 2, the processor block 54 now receives the outputs from GPS 20 and GPS 26 directly on lines 51, 52, 58, and 60 respectively. It is seen that as connected in FIG. 2, the processing block 54 receives the two sets of outputs constantly and simultaneously. It can then observe the outputs and determine if those from GPS 20 are no longer valid and, if not, to use the outputs from GPS 26 instead. Thereafter, it can observe the outputs from GPS 20 on lines 51 and 52 as often as desired without interrupting the signals on lines 58 and 60 from GPS 26. If it determines that the output from GPS 20 is again acceptable, it can begin using GPS 20 as it's primary source without interruption by continuously validating each channel. The hybrid output from processing block 54 is presented to the FMS 38 on a connection 62.

Thus it is seen that we have provided a novel and more reliable dual GPS/IRS hybrid system. Furthermore, the additional space and cost encountered by use of the MUX 24 in FIG. 1 has been avoided.

Although the present invention has been described with reference to a preferred embodiment, workers skilled in the art will recognize that changes may be made in form and detail without departing from the spirit and scope of the invention. For example, if a hybrid system is not needed, but a redundant GPS is still desired, the IRS hardware 12 could be omitted. Apparatus other than Gyros and accelerometers could supply the attitude and rate information. Accordingly, we do not wish to be limited by the specific disclosures used in describing the preferred embodiment.

The embodiments of the invention in which an exclusive property or right is claimed are defined as follows:

1. Apparatus for producing a GPS position signal comprising:

a first GPS receiver having an output which includes position and rate information and a time mark;

a second GPS receiver having an output which includes position and rate information and a time mark; and, a processing block connected directly to the first and second GPS receivers to simultaneously receive the outputs thereof, utilizing the outputs of the first GPS receiver until it is determined that the first GPS receiver outputs are no longer valid and then utilizing the outputs of the second GPS receiver while periodically checking the outputs of the first GPS receiver to determine if it's outputs become usable again.

2. Apparatus according to claim 1 further including an independent source of information producing an output, which includes rate information and a cyclical interrupt, to the processing block, the processing block operating on the outputs to produce a hybrid signal.

3. Apparatus according to claim 2 wherein the independent source of information comprises accelerometers and gyroscopes.

4. Apparatus according to claim 3 wherein the processing block synchronizes the information from the GPS being utilized with the information from the independent source by synchronizing the time mark and the cyclical interrupt.

5. Apparatus according to claim 1 wherein the processing block utilizes the outputs of the second GPS receiver until it is determined the first GPS receiver outputs are usable again and thereafter utilizes the outputs of the first GPS receiver.

6. The method of processing the outputs of redundant GPS receivers comprising the steps of;

a) connecting the output of a first GPS receiver directly to a processing block so as to produce a resulting signal;

b) connecting the output of a second GPS receiver directly to the processing block;

c) connecting the resulting signal from the processing block to utilization apparatus and monitoring the output of the first GPS receiver to determine when its output becomes invalid; and d) upon detecting that the output of the first GPS receiver is invalid, utilizing the output of the second GPS receiver to produce the resulting signal to the utilization apparatus while continuing to monitor the output of the first GPS receiver to determine if its output becomes valid again.

7. The method according to claim 6 further including the step of:

e) re-utilizing the output of the first GPS to produce the resulting signal to the utilization apparatus upon determining that the first GPS output is valid again.

8. The method according to claim 6 further including, after step b), the step of:

b1) connecting an independent source of information to the processing block and wherein the resulting signal of step c) is a hybrid signal.

9. The method according to claim 7 further including, after step b), the step of:

b1) connecting an independent source of information to the processing block and wherein the resulting signal of step c) is a hybrid signal.

\* \* \* \* \*